April 15, 1969     G. A. NICKERSON     3,438,146
REMOVABLE LAWN EDGING DEVICE
Filed April 3, 1967
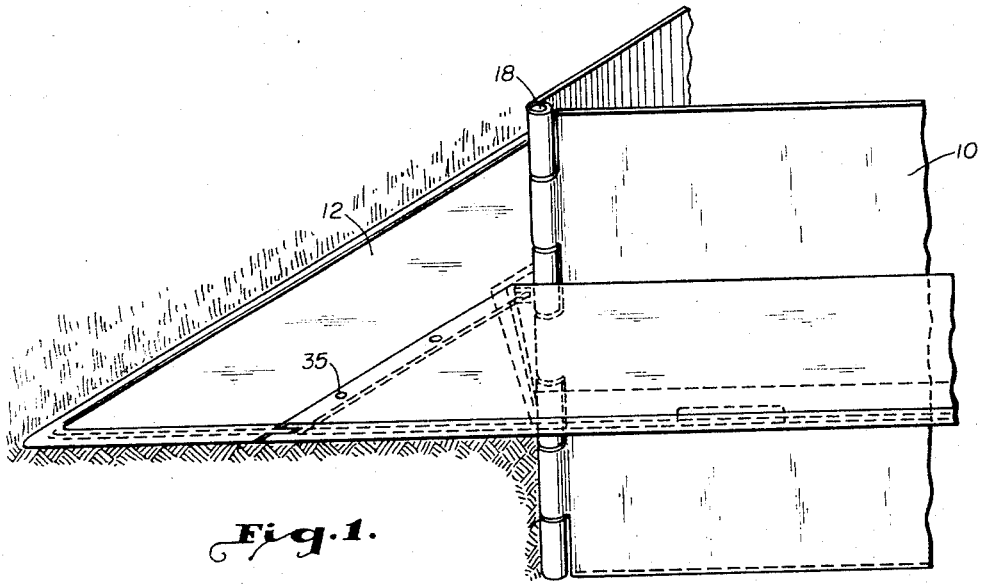
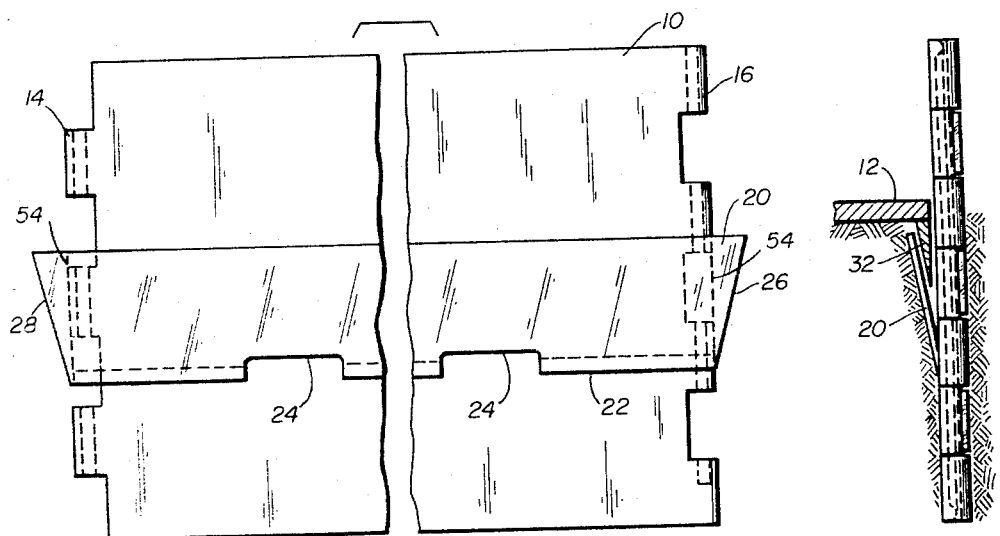
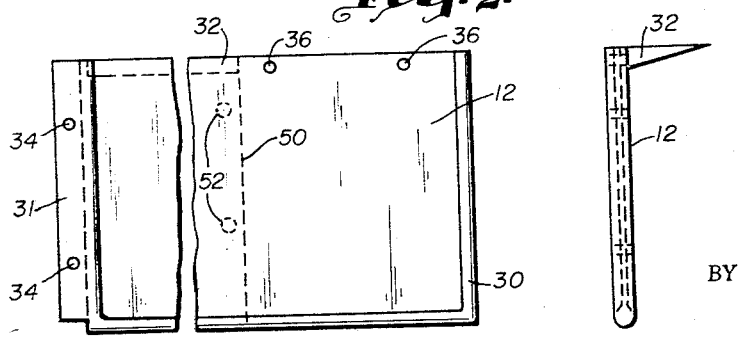
INVENTOR.
GENE A. NICKERSON
BY Head & Johnson
ATTORNEYS 3,438,146
REMOVABLE LAWN EDGING DEVICE
Gene A. Nickerson, 4005 S. 96th East Ave.,
Tulsa, Okla. 74145
Filed Apr. 3, 1967, Ser. No. 628,038
Int. Cl. A01g 3/06; E01c 11/22
U.S. Cl. 47—33
8 Claims

ABSTRACT OF THE DISCLOSURE

A lawn edging device including identical interlockable vertical portions and removable and interlocking horizontal ground cover portions.

Background of the invention

This invention relates to ornamental lawns and flower beds in the plant husbandry art. Specifically, this invention relates to a lawn or garden edging device in which to prevent surrounding grass from entering gardens or flowers or other plant beds, and further enable the surrounding grass to be cut neatly and trimmed, utilizing a lawnmower without the necessity of hand trimming.

Metal lawn edgings, primarily of a vertical nature, such as shown in U.S. Patent 2,821,809, of Collier et al., has been used and known in the prior art to prevent relatively horizontal movement of grass roots and growth into garden beds and planting areas. Although combinations of relatively vertical walls and horizontal covering elements have been taught such as in U.S. Patent 2,184,904, of Boehme, and Landis in Patent No. 397,732, consideration to removability of the horizontal portion was not considered until the patents of Hendrixson, No. 2,713,751, and Richter, No. 3,041,781. The latter two patents, however, provide respectively a fixed horizontal ground covering member in which a hinged flap is coverable thereacross for ornamental and not functional purposes, whereas Richter discloses a hinged horizontal cover interconnected with the vertical portion. Such construction involves difficulties in its fabricaton and placement relative to a given or desired edging. In addition, there is insufficient protective coverage for the corners for abutting ground cover elements. Further, the utilization of a hinge is involved with difficulties from dirt, grit, moisture and corrosion unless exotic materials are utilized which make such devices economically prohibitive. In addition, the hinging action actually can cause interference during the mowing operation and greatly hinders its advantages as a horizontal cover member.

Accordingly, it is an object of this invention to provide a lawn and bed edging apparatus in which the horizontal covering or mowing strip portion is completely removable from the vertical edging portion.

It is a further object of this invention to provide a lawn edging construction from members which are interchangeable and interlockable to provide complete coverage and protection of garden and other ornamental bed areas from encroaching grass.

A still further object from this invention is to provide a lawn or ground edging in which the vertical portion is easily and properly placed and arrangeable to a designed configuration.

Brief description of the drawings

FIGURE 1 is a partial perspective view depicting the construction of the interlocking horizontal and vertical parts of this invention at a corner and along one partial side thereof.

FIGURE 2 is a front elevational view of a typical vertical panel constructed in accordance with this invention.

FIGURE 3 is a side elevational view of the panel of FIGURE 2 with a portion of the horizontal member in place.

FIGURE 4 is a top elevational view, partially cut away, depicting the horizontal removable mowing strip of this invention.

FIGURE 5 is a side elevational view of the panel of FIGURE 4.

FIGURE 6 is a partial sectional view describing a typical longitudinal interconnection of adjacent horizontal panels.

Description of preferred embodiment

Generally, the invention comprises a plurality of interconnected vertical panels 10 and removable horizontal panels 12 which can be interconnected either along a given line with respective male and female connection members 14 and 16 to receive a vertical pin therein 18. Each panel includes longitudinally thereof which will be approximately at the proposed ground level, an interlock member 20. This member is interconnected along its lower longitudinal edge 22 to the panel member 10 so as to extend upwardly and outwardly therefrom at an angular relationship. Openings 24 are provided at various positions along the bottom longitudinal edge for drainage purposes. The ends of the interlocking members 20 are beveled as shown at 26 and 28 to permit interconnection at corners between the next adjacent vertical panel member. The horizontal panel members 12 are formed of a relatively flat member preferably with a structural ridge 30 along the outer portions thereof. This ridge not only provides strength but directs moisture toward the protected bed. Each of said horizontal members includes at least one normally vertically oriented wedge-like member 32 which is adapted to interlock into the angular space formed by member 20 respective to the vertical panel 10. The ends of the horizontal members 12 include interlocking tongue and groove portions 31 with suitable openings 34 for interlocking between adjacent pieces. To extend the horizontal panels longitudinally panel 12 is cut along line 50 and openings 52 drilled or "popped-out" to accommodate connection as shown in FIGURE 6. Interlocking members 20 are shearable or bent along lines 54 in order that adjacent panels 10 can interlock along a longitudinal line. In the event it is desired to lock the pieces around a corner openings 36 are provided which will match with the next adjacent groove portion 32 and hence extend 90° therefrom. Accordingly by producing two basic members 10 and 12 the edging of this invention becomes diversified to a particular application.

It is to be understood that this invention is inclusive of horizontal and vertical panels 10 and 12 which are interlockable in a circular arrangement wherein the horizontal members are arcuate in quarter section portions.

In operation, once the desired size and design of bed is established, the necessary interlocking vertical panels 10 are connected and positioned in a straight line or forming right angle corners as desired.

The member 20 acts as a depth guide, as it is preferably positioned so that its upper edge is substantially at ground level. The panels are interlocked by the hinge means 14 and 16 and connected by a pin 18. The relatively horizontal ground covering members are formed longitudinally and perpendicularly and interconnected with pins 35 as needed. Thereafter the wedge member 32 is placed within the angular space formed by member 20 relative to the vertical member 10. When it is desired to mow the area adjacent that which is covered by strip or member 12, it is removed from its position allowing the mower to neatly trim the edge without hand operation, after which the horizontal ground covering members 12 are assembled and repositioned.

It is to be understood that the members are preferably prepared from high strength synthetic resins, although metallic members or wood pieces of redwood or cedar are inclusive. In addition the lengths of the various members can be variable to achieve a desired configuration.

This invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

What is claimed:

1. A lawn or ground edging comprising
   (A) a vertical panel member having means along each vertical end to interconnect with the same means on adjacent vertical panel members,
      a longitudinal interlock panel attached along its bottom edge to one side of said vertical panel member with its upper edge extending upwardly and outwardly of said vertical panel member,
   (B) a horizontal panel member having means along each horizontal end to longitudinally interconnect with the same means on adjacent horizontal panel members, and
      a downwardly extending member extending along one longitudinal edge to be positionable within the space between said interlock panel and said vertical panel member whereby said horizontal panel member rests upon said lawn or ground yet is removable from said interlock.

2. A lawn or ground edging according to claim 1 wherein
   said means along each vertical end of said vertical panel member comprises
   male connection means along one vertical edge and female connection means along the opposite edge.

3. A lawn or ground edging according to claim 1 wherein
   said means along each horizontal end of said horizontal panel member comprises
   male connection means along one horizontal end and female connection means along the opposite end.

4. A lawn or ground edging according to claim 1 wherein
   said means along each vertical end of said vertical panel member comprises
   male connection means along one vertical edge and female connection means along the opposite edge, and
   said means along each horizontal end of said horizontal panel member comprises
   male connection means along one horizontal end and female connection means along the opposite end.

5. A lawn or ground edging according to claim 4 wherein
   said interlock panel includes at least one opening adjacent said attachment edge to permit water drainage.

6. A lawn or ground edging according to claim 1 wherein said horizontal panel member includes a ridge along its outer edges.

7. A lawn or ground edging according to claim 1 wherein said horizontal panel member includes means to interconnect an adjacent horizontal panel member perpendicular thereto.

8. A lawn or ground edging according to claim 7 wherein said horizontal panel members include a ridge along their outer edges.

References Cited

UNITED STATES PATENTS

| | | | |
|---|---|---|---|
| 397,732 | 2/1889 | Landis | 47—33 |
| 2,184,904 | 12/1939 | Boehme | 47—33 |
| 3,373,668 | 3/1968 | Moore et al. | 47—33 XR |

ROBERT E. BAGWILL, *Primary Examiner.*

U.S. Cl. X.R.

94—31